(12) United States Patent
Libal (10) Patent No.: US 9,147,114 B2
(45) Date of Patent: Sep. 29, 2015

(54) VISION BASED TARGET TRACKING FOR CONSTRAINED ENVIRONMENTS

(75) Inventor: Vit Libal, Praha (CZ)

(73) Assignee: Honeywell International Inc., Morristown, NJ (US)

( * ) Notice: Subject to any disclaimer, the term of this patent is extended or adjusted under 35 U.S.C. 154(b) by 477 days.

(21) Appl. No.: 13/527,227

(22) Filed: Jun. 19, 2012

(65) Prior Publication Data

US 2013/0335571 A1    Dec. 19, 2013

(51) Int. Cl.
G06K 9/00    (2006.01)
H04N 7/18    (2006.01)
G06T 7/20    (2006.01)

(52) U.S. Cl.
CPC ........ *G06K 9/00771* (2013.01); *G06K 9/00335* (2013.01); *G06T 7/208* (2013.01); *G06T 2207/10016* (2013.01); *G06T 2207/20076* (2013.01); *G06T 2207/30196* (2013.01); *G06T 2207/30232* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 7,416,118 B2* | 8/2008 | Throckmorton et al. | 235/383 |
| 8,165,349 B2* | 4/2012 | Bobbitt et al. | 382/103 |
| 2004/0151366 A1* | 8/2004 | Nefian et al. | 382/154 |
| 2005/0102183 A1 | 5/2005 | Kelliher et al. | |
| 2006/0291695 A1* | 12/2006 | Lipton et al. | 382/103 |
| 2007/0008101 A1 | 1/2007 | Fallin et al. | |
| 2007/0058040 A1* | 3/2007 | Zhang et al. | 348/150 |
| 2008/0018738 A1 | 1/2008 | Lipton | |
| 2008/0303902 A1 | 12/2008 | Romer et al. | |
| 2009/0237219 A1 | 9/2009 | Berlin et al. | |
| 2012/0207346 A1* | 8/2012 | Kohli et al. | 382/103 |

OTHER PUBLICATIONS

Laxton, Benjamin, J. Lim, D. Kriegman, "Leveraging temporal, contextual and ordering constraints for recognizing complex activities in video", CVPR '07. IEEE Conference on Computer Vision and Pattern Recognition, IEEE, 2007, pp. 876-883.*
B. Laxton, J. Lim, D. Kriegman "Leveraging temporal, contextual and ordering constraints for recognizing complex activities in video", CVPR '07 IEEE Conference on Computer Vision and Pattern Recognition, IEE, 2007.*

* cited by examiner

*Primary Examiner* — William C Vaughn, Jr.
*Assistant Examiner* — Stuart Bennett
(74) *Attorney, Agent, or Firm* — Schwegman Lundberg & Woessner, P.A.

(57) ABSTRACT

A system and method includes obtaining and storing video frames from a series of video frames on a computer readable storage device, calculating probability estimates for target locations in each frame for targets in a constrained environment, and determining candidate target locations in each frame.

16 Claims, 5 Drawing Sheets

VISION BASED TARGET TRACKING FOR CONSTRAINED ENVIRONMENTS

BACKGROUND

Target tracking is utilized in scene understanding/situation awareness systems. Often, a sensor providing target location information for such system is a video camera. Examples of such systems are video surveillance systems used for safety, security, person or asset tracking and others. Ordinary algorithms providing video based target tracking are based on Kalman filtering or particle filtering or related methods.

SUMMARY

A method includes obtaining and storing video frames from a series of video frames on a computer readable storage device, estimating locations of targets in each frame, by calculating probability estimates for each possible location of target in each frame, and selecting, for each target, the location with maximum probability.

The method is encoded on a computer readable storage device in a further embodiment.

A system includes a video analytics module that executes code stored on a storage device to obtain and store video frames from a series of video frames on a computer readable storage device, calculate probability estimates for target locations in each frame for targets in a constrained environment, and determine targets' locations in each frame.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

One problem recognized by the inventors with ordinary/state of the art algorithms for performing video analysis in a surveillance system is that, for certain tasks in certain environments, they assume models for target's kinematics and sensor's observation of the target that are not correct or applicable to the given task/environment. This problem occurs in particular case of targets moving within an environment with strong constraints that limit the possible motion of the target. In such case, the conventional targets' kinematics and observation models are misleading and their use leads to incorrect tracking.

Figure 1:
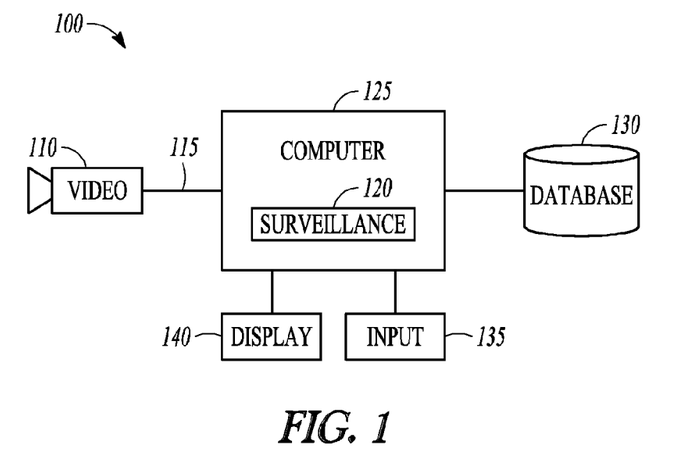
FIG. 1 is a block diagram of a surveillance system according to an example embodiment.

One example of such task/environment is a point of sale (POS) surveillance system 100, where an overhead camera 110 placed above the POS device is collecting the video data 115 to analyze POS personnel actions for purposes of e.g. retail shrinkage prevention in so called sweethearting detection via a surveillance application 120 running on a computer 125. In one embodiment, about ten video frames per second are captured.

Computer 125 may be programmed with the application 120, which utilizes training data from a storage device, such as database 130 to perform analytics and identify targets. In further embodiments, the application 120 also utilizes the identified targets in sequential video frames to identify motions and categorize them according to models of motions attributed to different behaviors. An input 135 and display 140 provide for interaction with the application 120 by security personnel.

Figure 2:
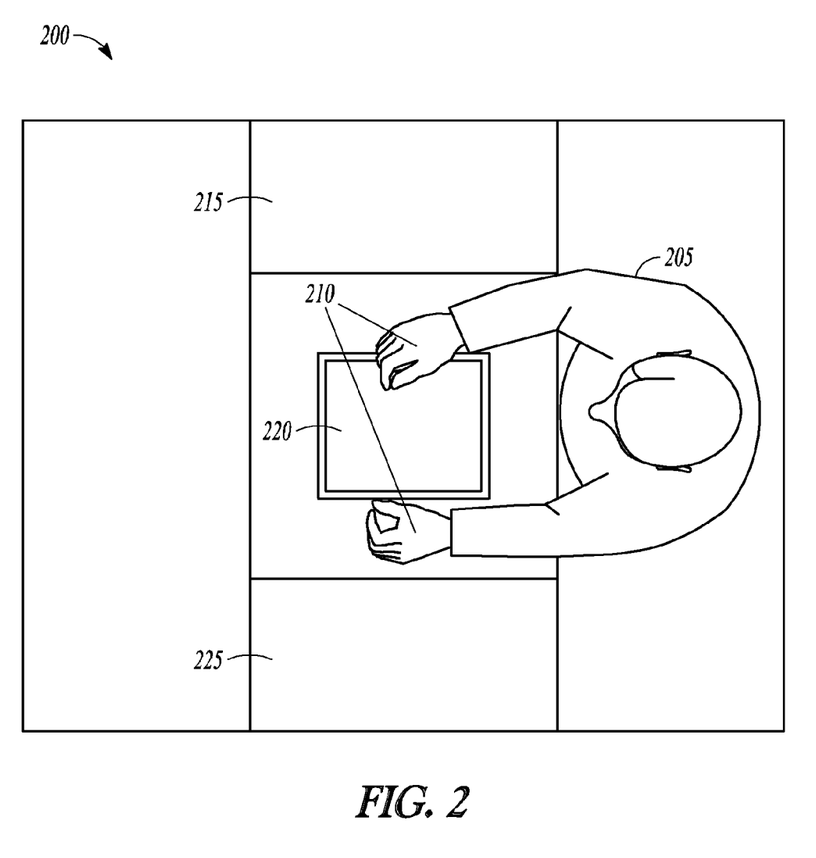
FIG. 2 is a block diagram illustrating a field of view of a surveillance system video camera of a constrained surveillance environment according to an example embodiment.

In one example indicated at 200, the tracked targets are cashier's head 205 and hands 210 as illustrated in a block diagram in FIG. 2 illustrating a field of view 200 of the surveillance system video camera 115 of a constrained surveillance environment according to an example embodiment.

The cashier's hands 210 perform consistent motion patterns taking the items from a POS conveyor belt 215 or stationary surface, passing the items over a bar code scanning area 220 and dropping the items in a bagging area 225. The head motion occurs in a small area defined by the cashier's standpoint. In this case, the constraints are imposed by the bar code scanning task, by physical constraints of the cashier's motion and by physical connections among the targets.

For example, the hand motion at the POS is specific by strong dependency of the motion characteristics (trajectory, speed) on the current hands' position at the point of sale. In a more detailed example, the trajectory and speed of right hand's motion across the pickup area dramatically differs from right hand's motion across the scanning area or from left hand's motion across the scanning area etc. Other examples of video target tracking in a constrained task/environment is hand gesture recognition, body parts tracking of a gaming console user and others.

A constant prior model common for all tracked targets (as e.g. in the Kalman filtering case) therefore neglects a lot of usable information.

In various embodiments, Bayesian motion modeling may be used with nonparametric probability density models for target observation and target propagation. Bayesian motion modeling allows the inclusion of specific and position dependent prior knowledge describing dependencies among target locations in consecutive frames (that is a motion of a target) and between target locations and observations. This prior knowledge may be supplied in the form of nonparametric probability densities represented by multidimensional matrixes with element values trained on a training data set. These nonparametric probability densities capture constraints of the environment imposed on the targets' motion and appearance.

In further embodiments, the solution includes practical features providing computational feasibility such asprobability model simplifications and use and computation of nonparametric probability densities matrixes.

Figure 3A:
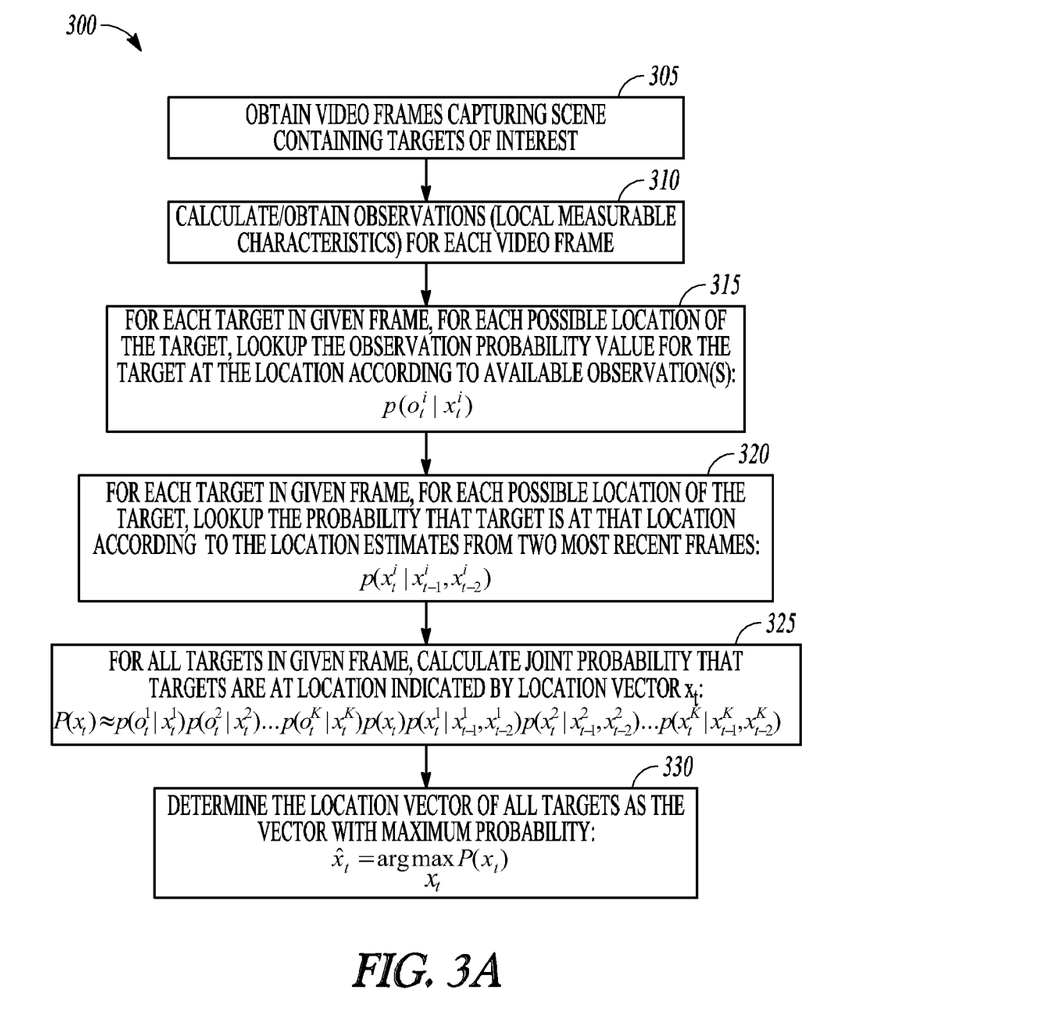
FIG. 3A is a flowchart illustrating a method of tracking targets in frames of an environment with constrained motions according to an example embodiment.
Figure 3B:
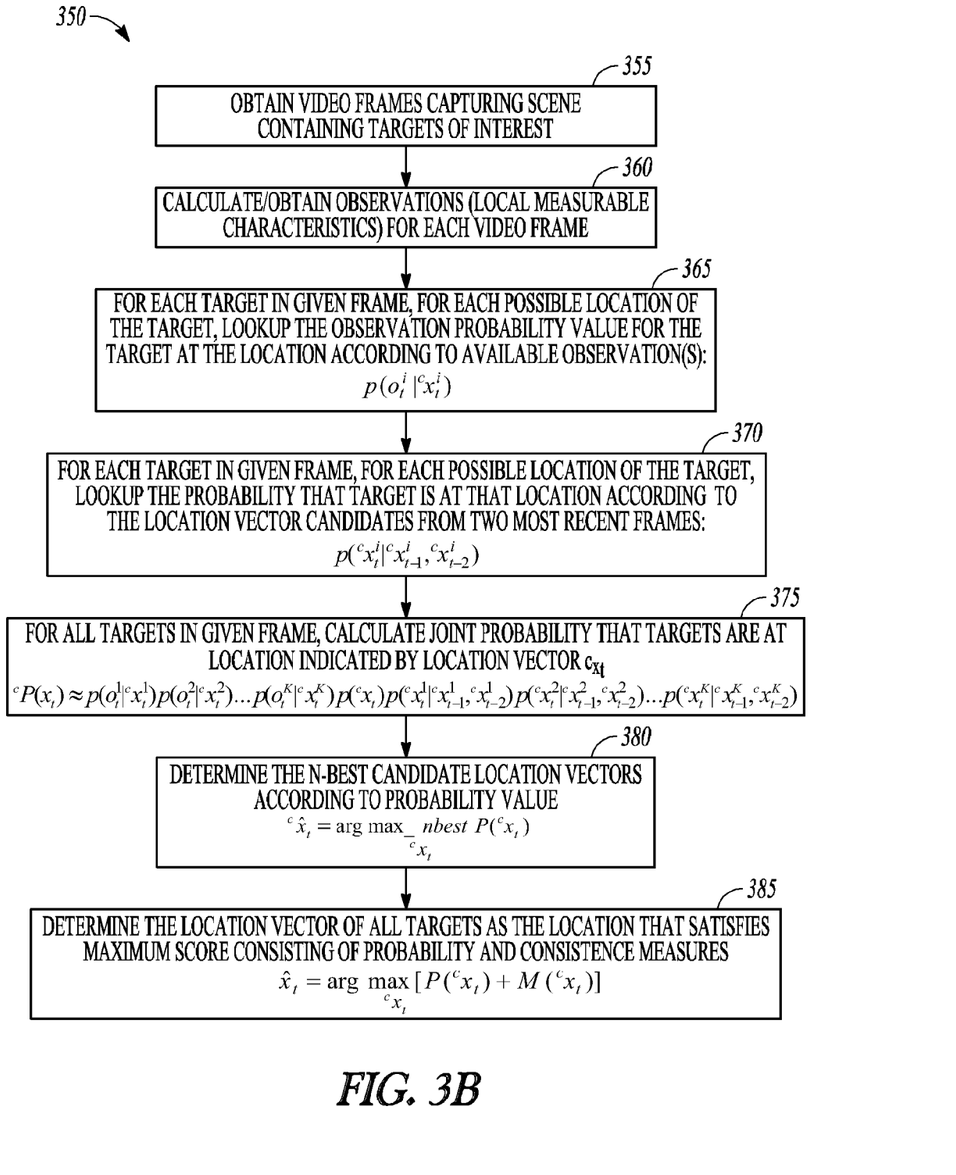
FIG. 3B is a flowchart illustrating and alternative method of tracking targets in frames of an environment with constrained motions according to an example embodiment.

Tracking of one or multiple targets in a video sequence (the term "video sequence" refers to sequence of digitized images (also referred to as "frames") captured by the video camera) may be performed using a probabilistic model that considers joint probabilities of the targets' locations as illustrated in method 300 in FIG. 3A and alternatively at 350 in FIG. 3B. At each frame of a given video sequence, it is assumed the availability of local measurable image characteristics that results from target's presence or target's motion at given image location. These characteristics will be referred by the term "observations". The observations may be for example:

Image areas, representing a set of possible targets' locations, detected using the motion and foreground detection algorithms from the video sequence, Image areas, representing a set of possible targets' locations, detected using the appearance detection algorithms such as contour or color detection, Points within the image, representing an approximate targets' locations, detected using other means (either based on image analysis or from other sensors)

At each frame of a given video sequence, it is also assumed the availability of an estimate of targets' locations corresponding to previous frames of the video sequence.

In some embodiments, the location of a target in a frame refers to a point, expressed in terms of local image coordinates, that uniquely represent a position of the target within the image that corresponds to the video frame. The method presented in this description assumes that the video frames originate from a fixed view video camera(s) where the local image coordination system does not change its relation to the global coordination system over the time.

With these assumptions, video frames are obtained at 305, 355, and location targets are estimated for a current video frame by maximizing a probability at 330:

$$\hat{x}_t = \underset{x_t}{\mathrm{argmax}}\, P(x_t)$$

$$P(x_t) = p(x_t \mid o_t) p(x_t \mid x_{t-1}, x_{t-2}, \ldots, x_0)$$

$$p(x_t \mid o_t) \approx p(o_t \mid x_t) p(x_t)$$

where $o_t$ is a vector of targets' observations, obtained at 310, 360, for the video frame 't', $x_t$ is a vector of targets' locations in the video frame 't', $x_{t-1}$ is a vector of targets' locations in the video frame 't−1' etc, $P(x_t)$ is joint probability of targets' locations, $p(x_t|o_t)$ is joint probability of targets' locations given its known observations, $p(x_t|x_{t-1}, x_{t-2}, \ldots x_0)$ is probability of current targets' locations given known past target locations (i.e. the joint target propagation model), $p(o_t|x_t)$ is probability of observations $o_t$ given known vector of targets locations $x_t$ (i.e. joint target observation model), and, $p(x_t)$ models joint prior probability of targets' locations.

The symbol "≈" is used in these equations to signify that the first element may be replaced by the second element as is commonly understood in the art.

The term $p(o_t|x_t)$ models probability of targets at locations $x_t$ emitting observations $o_t$. It may be further decomposed assuming independence of observations of each target:

$$p(o_t|x_t) = p(o_t^1|x_t^1) p(o_t^2|x_t^2) \ldots p(o_t^K|x_t^K)$$

where superscript indices 1, 2, ... K refers to tracked targets and $p(o_t^i|x_t^i)$, obtained at 315, is a probability of single target i (i=1, 2, ... K) emitting observation $o_t^i$. The dependency on past target locations can be simplified by neglecting influence of older samples of targets' locations:

$$p(x_t|x_{t-1}, x_{t-2}, \ldots, x_0) \approx p(x_t|x_{t-1}, x_{t-2})$$

Further simplification is omission of interdependencies of propagation models among the targets:

$$p(x_t|x_{t-1}, x_{t-2}) = p(x_t^1|x_{t-1}^1, x_{t-2}^1) p(x_t^2|x_{t-1}^2, x_{t-2}^2) \ldots p(x_t^K|x_{t-1}^K, x_{t-2}^K)$$

where superscript indices 1, 2, ... K refers to tracked targets and $p(x_t^i|x_{t-1}^i, x_{t-2}^i)$ obtained at 320, is a propagation probability of single target i (i=1, 2, ... K).

The two simplifications above enable a feasible solution while maintaining a good accuracy, resulting in the probability distribution estimates at 325:

$$P(x_t) \approx p(o_t^1|x_t^1) p(o_t^2|x_t^2) \ldots p(o_t^K|x_t^K) p(x_t) p(x_t^1|x_{t-1}^1, x_{t-2}^1) p(x_t^2|x_{t-1}^2, x_{t-2}^2) \ldots p(x_t^K|x_{t-1}^K, x_{t-2}^K)$$

Figure 4:
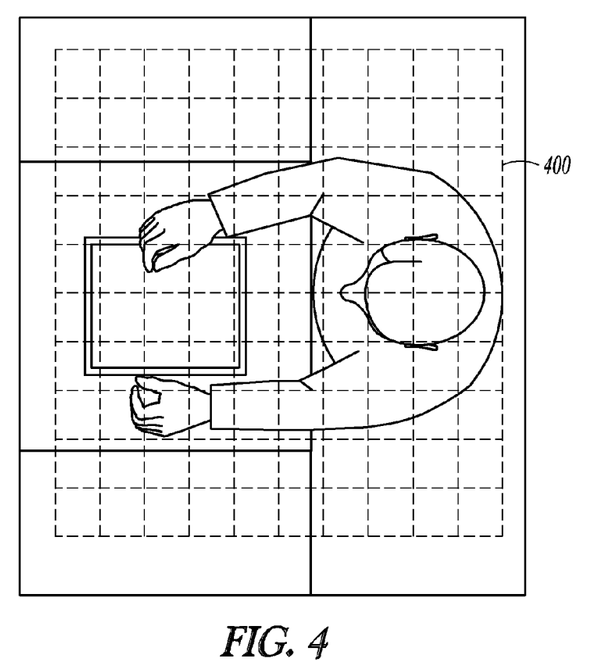
FIG. 4 is a block diagram illustrating a field of view with an overlaid grid according to an example embodiment.

The above probability distributions may be modeled using nonparametric models learned from a training data set ("training data set" represents a set of representative video sequences dedicated for model training). Each probability term in the equation above is then represented by a multidimensional matrix. The $p(o_t^i|x_t^i)$, terms are represented by four-dimensional matrixes (two matrix dimensions are the observation location coordinates, other two dimensions are target's location coordinates), the $p(x_t^i|x_{t-1}^i, x_{t-2}^i)$ are represented by six dimensional matrixes (the dimensions are the target's location coordinates from current frame and from the two most recent frames) and the $p(x_t^k)$ term is expressed by 2*K dimensional matrix, where K is a number of targets. For feasibility reasons, the number of possible targets' locations may be reduced by restricting the locations to values to a predetermined frame grid with appropriate granularity as illustrated at 400 in FIG. 4. This causes the matrixes that represent the probability terms from the above equation to have a reasonable size.

Figure 5:
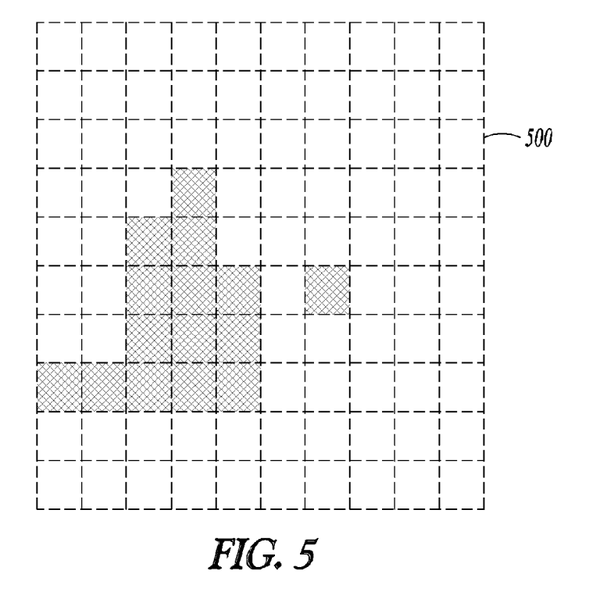
FIG. 5 is a block diagram illustrating information portrayed in an information grid corresponding to a constrained environment according to an example embodiment.

In one embodiment, the training of the probability distributions may be reduced to counting the grid location hits (by the annotated targets' location) and storing the hit counts in the multidimensional probability matrixes. FIG. 5 illustrates a frame grid 500 with different shaded boxes or grid location hits corresponding to different probabilities for each grid location. Grids with more or fewer grid location hits may be utilized for this environment or different constrained environments in further embodiments.

The tracking of the targets is then accomplished by computing, for each frame, the above given probability estimate $P(x_t)$ for each possible target location vector, except that a true target location vectors $x_{t-1}$, $x_{t-2}$ can be exchanged with their estimates $\hat{x}_{t-1}$, $\hat{x}_{t-2}$ obtained from previous frames, at 330, (which is a best approximation, given the fact that the true targets' locations are unknown). The location that maximizes the probability estimate P(x$_t$) at each frame is then selected and retained.

A variant of this method, described in FIG. 3B, keeps track of multiple candidates of the targets' locations based either on their number (n-best) or based on their probability value. In this variant, as indicated in 380, the method stores a multiple candidate location vectors instead selecting just a single one as described above in method 300 according to a predefined formula. For instance, a predefined number of location vectors may be selected according the formula:

$$^c\hat{x}_t = \operatorname*{argmax\_nbest}_{^c x_t} P(^c x_t),$$

where the upper index c identifies the candidate at 380 and "arg max_nbest P($^c$x$_t$)" indicates a relation that attains the set of n largest arguments $^c$x$_t$ of the function P. Further, in this variant of the method, the location vector of all targets is selected at 385 among the candidates, that maximizes a score that captures the location probability estimate P($^c$x$_t$) and a measure of consistence M($^c$x$_t$) which prevents fast switching among the candidates in case that their probability estimate values P($^c$x$_t$) are similar, for instance:

$$\hat{x}_t = \operatorname*{argmax}_{^c\hat{x}_t}[P(^c\hat{x}_t) + M(^c\hat{x}_t)],$$

where
M($^c\hat{x}_t$)=A . . . if same candidate as the one selected in previous frame
M($^c\hat{x}_t$)=0 . . . if other candidate as the one selected in previous frame
Consequently, the probability terms described in method 300 are expressed not only for all target locations, but for all candidates of all target locations, i.e.: p($^c$x$_t$|o$_t$) and p($^c$x$_t$|$^c$x$_{t-1}$, $^c$x$_{t-2}$, . . . $^c$x$_0$) at 365, 370 and 375. This variant therefore leads to a more reliable and robust estimate but its implementation may utilize more memory and/or computational resources.

Figure 6:
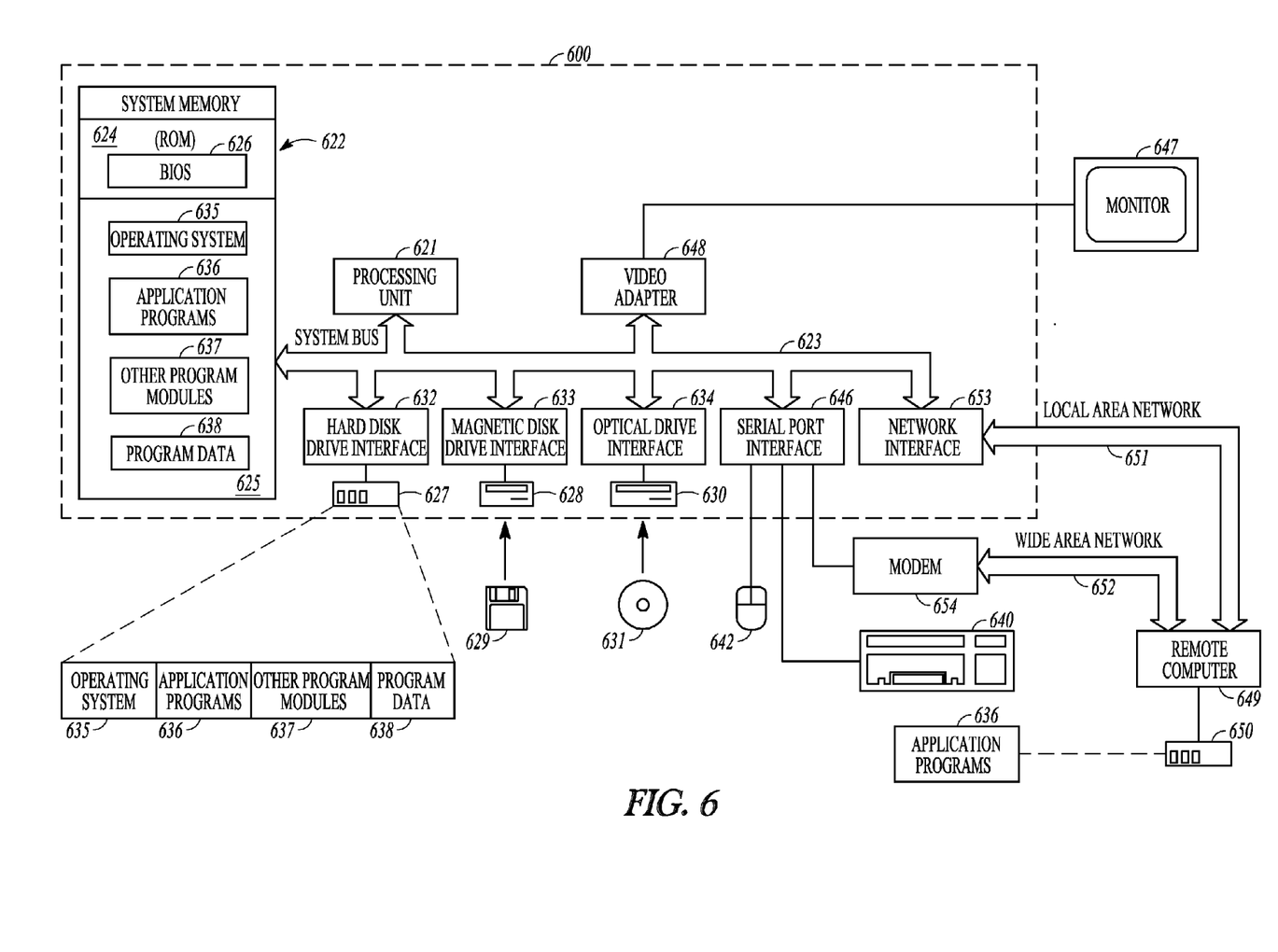
FIG. 6 is a block diagram of an example computer system for tracking motion according to an example embodiment.

FIG. 6 is a block diagram of a computer system to implement methods according to an example embodiment. In the embodiment shown in FIG. 6, a hardware and operating environment is provided that is applicable to control a surveillance system and process images captured by the system in accordance with algorithms described and/or shown in the other Figures.

As shown in FIG. 6, one embodiment of the hardware and operating environment includes a general purpose computing device in the form of a computer 600 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; the invention is not limited to a particular type of communications device. The remote computer 649 can be another computer, a server, a router, a network PC, a client, a peer device or other common network node, and typically includes many or all of the elements described above 110 relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A computer implemented method comprising:
obtaining and storing video frames from a series of video frames on a computer readable storage device;
calculating probability estimates for target locations in each frame for targets in a constrained environment; and
determining candidate target locations in each frame.

2. The method of example 1 wherein the probability estimate for target locations in a video frame 't' is calculated in accordance with:

$$P(x_t) = p(x_t|o_t)p(x_{t-1}, x_{t-2}, \ldots, x_0)$$

$$p(x_t|o_t) \approx p(o_t|x_t)p(x_t)$$

where $o_t$ is a vector of targets' observations for the video frame 't', $x_t$ is a vector of targets' locations in the video frame T, $x_{t-1}$ is a vector of targets' locations in the frame 't-1' etc., $P(x_t)$ is joint probability of targets' locations, $p(x_t|o_t)$ is probability of targets' locations given its known observation, $p(x_t|x_{t-1}, x_{t-2}, \ldots x_0)$ is probability of current targets' locations given known past target locations (i.e. the joint target propagation model), $p(o_t|x_t)$ is probability of observations $o_t$ given known targets locations $x_t$ (i.e. joint target observation model) and, $p(x_t)$ models joint prior probability of targets' locations.

3. The method of example 2 wherein the target's locations are determined as vector of locations that maximizes the probability for each location target is calculated in accordance with:

$$\hat{x}_t = \underset{x_t}{\operatorname{argmax}} P(x_t)$$

4. The method of example 3 wherein the target observation probability for each target is assumed independent thus yielding:

$$p(o_t|x_t) = p(o_t^1|x_t^1)p(o_t^2|x_t^2) \ldots p(o_t^K|x_t^K)$$

where superscript indices 1, 2, ... K refer to tracked targets.

5. The method of example 3 where multiple candidates of target's locations are maintained in each step and used for calculating the target's locations estimate.

6. The method of example 3 and further comprising identifying patterns of target motions indicative of undesired behavior.

7. The method of any of examples 2-6 and further comprising simplification of the target propagation model and omitting interdependencies of propagation models among targets so that $$p(x_t|x_{t-1}, x_{t-2}, \ldots x_0) \approx p(x_t|x_{t-1}, x_{t-2})$$

$$p(x_t|x_{t-1}, x_{t-2}) = p(x_t^1|x_{t-1}^1, x_{t-2}^1)p(x_t^2|x_{t-1}^2, x_{t-2}^1) \ldots p(x_t^K|x_{t-1}^K, x_{t-2}^K)$$

8. The method of example 7 wherein the probability densities of the final equation $$P(x_t) \approx p(o_t^1|x_t^1)p(o_t^2|x_t^2) \ldots p(o_t^K|x_t^K)p(x_t)p(x_t^1|x_{t-1}^1, x_{t-2}^1)p(x_t^2|x_{t-1}^2, x_{t-2}^2) \ldots p(x_t^K|x_{t-1}^K, x_{t-2}^K)$$

are expressed in non-parametric form with each probability term represented by multidimensional matrices with element values trained on a training data set that captures motion constraints corresponding to a selected constrained environment.

9. A computer readable storage device having instructions for causing a computer to implement a method, the method comprising:
obtaining and storing video frames from a series of video frames on a computer readable storage device;
calculating probability estimates for target locations in each frame for targets in a constrained environment; and
determining candidate target locations in each frame.

10. The computer readable storage device of example 9 wherein the probability estimate for target locations in a video frame 't' is calculated in accordance with:

$$P(x_t) = p(x_t|o_t)p(x_{t-1}, x_{t-2}, \ldots, x_0)$$

$$p(x_t|o_t) \approx p(o_t|x_t)p(x_t)$$

where $o_t$ is a vector of targets' observations for the video frame 't', $x_t$ is a vector of targets' locations in the video frame T, $x_{t-1}$ is a vector of targets' locations in the frame 't-1' etc., $P(x_t)$ is probability of targets' locations, $p(x_t|o_t)$ is probability of targets' locations given its known observation, $p(x_t|x_{t-1}, x_{t-2}, \ldots x_0)$ is probability of current targets' locations given known past target locations (i.e. the joint target propagation model), $p(o_1|x_t)$ is probability of observations $o_t$ given known targets locations $x_t$ (i.e. joint target observation model) and, $p(x_t)$ models prior probability of targets' locations.

11. The computer readable storage device of example 10 wherein the target's locations are determined as vector of locations that maximizes the probability for each location target is calculated in accordance with:

$$\hat{x}_t = \underset{x_t}{\operatorname{argmax}} P(x_t)$$

12. The computer readable storage device of example 11 wherein the target observation probability for each target is assumed independent thus yielding:

$$p(o_t|x_t) = p(o_t^1|x_t^1)p(o_t^2|x_t^2) \ldots p(o_t^K|x_t^K)$$

where superscript indices 1, 2, ... K refer to tracked targets.

13. The computer readable storage device of example 11 where multiple candidates of target's locations are maintained in each step and used for calculating the target's locations estimate.

14. The computer readable storage device of example 11 and further comprising identifying motions indicative of undesired behavior.

15. The computer readable storage device of any of examples 10-14 and further comprising simplification of the target propagation model and omitting interdependencies of propagation models among targets so that $$p(x_t|x_{t-1},x_{t-2},\ldots x_0) \approx p(x_t|x_{t-1},x_{t-2})$$

$$p(x_t|x_{t-1},x_{t-2}) = p(x_t^1|x_{t-1}^1,x_{t-2}^1)p(x_t^2|x_{t-1}^2,x_{t-2}^1)\ldots p(x_t^K|x_{t-1}^K,x_{t-2}^K)$$

16. The computer readable storage device of example 15 wherein the probability densities of the final equation $$P(x_t) \approx p(o_t^1|x_t^1)p(o_2^2|x_t^2)\ldots p(o_t^K|x_t^K)p(x_t)p(x_t^1|x_{t-1}^1, x_{t-2}^1)p(x_t^2|x_{t-1}^2,x_{t-2}^2)\ldots p(x_t^K|x_{t-1}^K,x_{t-2}^K)$$

are expressed in non-parametric form with each probability term represented by multidimensional matrixes with element values trained on a training data set that captures motion constraints corresponding to a selected constrained environment.

17. A system comprising a video analytics module that executes code stored on a storage device to:
   obtain and store video frames from a series of video frames on a computer readable storage device;
   calculate probability estimates for target locations in each frame for targets in a constrained environment; and
   determine candidate target locations in each frame.

18. The system of example 17 and further comprising:
   a camera to capture video frames of an environment having consistently constrained target motions; and
   an input to receive the video images.

19. The system of example 17 or 18 wherein the environment is point of sale surveillance system and the camera is placed above point of sale checkout area/scanning to detect sweethearting.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method for tracking a target in a constrained environment in which motion of the target is constrained, the method comprising:
   obtaining and storing video frames from a series of video frames on a computer readable storage device;
   calculating probability estimates for target locations in each frame for targets in the constrained environment; and
   determining candidate target locations in each frame,
   wherein the probability estimate for target locations in a video frame 't' is calculated in accordance with:

$$P(x_t) = p(x_t|o_t)p(x_t|x_{t-1},x_{t-2},\ldots x_0)$$

$$p(x_t|o_t) \approx p(o_t|x_t)p(x_t)$$

where $o_t$ is a vector of the targets' observations for the video frame 't', $x_t$ is a vector of targets' locations in the video frame 't', $x_{t-1}$ is a vector of the targets' locations in the frame 't−1', $P(x_t)$ is a joint probability of targets' locations, $p(x_t|o_t)$ is a probability of the target's locations given known observations, $p(x_t|x_{t-1}, x_{t-2}, \ldots x_0)$ is a probability of current targets' locations given known past target locations, $p(o_t|x_t)$ is a probability of observations $o_t$ given known target locations $x_t$ and, $p(x_t)$ models a joint prior probability of the targets' locations, and at least one of:

a) wherein the target's locations are determined as a vector of locations that maximizes the probability for each location target is calculated in accordance with:

$$\hat{x}_t = \underset{x_t}{\operatorname{argmax}} P(x_t)$$

and
wherein the target observation probability for each target is assumed independent thus yielding $$p(o_t|x_t) = p(o_t^1|x_t^1)p(o_2^2|x_t^2)\ldots p(o_t^K \times x_t^K)$$

where superscript indices 1, 2, ... K refer to tracked targets, and b) the method further comprises simplification of the target propagation model and omitting interdependencies of propagation models among targets so that $$p(x_t|x_{t-1},x_{t-2},\ldots x_0) \approx p(x_t|x_{t-1},x_{t-2})$$

$$p(x_t-x_{t-1},x_{t-2}) = p(x_t^1|x_{t-1}^1,x_{t-2}^1)p(x_t^2|x_{t-1}^2,x_{t-2}^2)\ldots p(x_t^K|x_{t-1}^K,x_{t-2}^K)$$

where superscript indices 1, 2, ... K refer to tracked targets.

2. The method of claim 1 wherein the target's locations are determined as a vector of locations that maximizes the probability for each location target is calculated in accordance with:

$$\hat{x}_t = \arg \underset{x_t}{\max} P(x_t).$$

3. The method of claim 2 wherein the target observation probability for each target is assumed independent thus yielding:

$$p(o_t|x_t) = p(o_t^1|x_t^1)p(o_t^2|x_t^2)\ldots p(o_t^K|x_t^K).$$

4. The method of claim 2 where multiple candidates of the target's locations are maintained and used for calculating the target's locations estimate.

5. The method of claim 4 wherein:
   the target's location vector is selected to maximize a score that captures the probability estimate and a measure of consistence that prevents fast switching among the candidates in the case that probability estimate values of the candidates are similar.

6. The method of claim 2 and further comprising identifying patterns of target motions indicative of sweethearting.

7. The method of claim 1 and further comprising simplification of the target propagation model and omitting interdependencies of propagation models among targets so that $$p(x_t|x_{t-1},x_{t-2},\ldots x_0) \approx p(x_t|x_{t-1},x_{t-2})$$

$$p(x_t|x_{t-1},x_{t-2}) = p(x_t^1|x_{t-1}^1,x_{t-2}^1)p(x_t^2|x_{t-1}^2,x_{t-2}^1)\ldots p(x_t^K|x_{t-1}^K,x_{t-2}^K).$$

8. The method of claim 7 wherein the probability densities of the final equation $$P(x_t) \approx p(o_t^1|x_t^1)p(o_t^2|x_t^2)\ldots p(o_t^K|x_t^K)p(x_t)p(x_t^1|x_{t-1}^1, x_{t-2}^1)p(x_t^2|x_{t-1}^2,x_{t-2}^2)\ldots p(x_t^K|x_{t-1}^K,x_{t-2}^K)$$

expressed in non-parametric form with each probability term represented by multidimensional matrixes with element values trained on a training data set that captures motion constraints corresponding to a selected constrained environment.

9. The method of claim 8 further comprising:
reducing the number of possible target locations by restricting the possible target locations to values to a predetermined frame grid with a predetermined granularity; and
reducing training of probability distributions to counting grid location hits and storing hit counts in the multidimensional probability matrixes.

10. A computer readable storage device having instructions for causing a computer to implement a method for tracking a target in a constrained environment in which motion of the target is constrained, the method comprising:
obtaining and storing video frames from a series of video frames on a computer readable storage device;
calculating probability estimates for target locations in each frame for targets in the constrained environment; and
determining candidate target locations in each frame,
wherein the probability estimate for target locations in a video frame 't' is calculated in accordance with:

$$P(x_t) = p(x_t|o_t)p(x_t|x_{t-1}, x_{t-2}, \ldots x_0)$$

$$p(x_t|o_t) \approx p(o_t|x_t)p(x_t)$$

where $o_t$ is a vector of the targets' observations for the video frame 't', $x_t$ is a vector of targets' locations in the video frame 't', $x_{t-1}$ is a vector of the targets' locations in the frame 't−1', $P(x_t)$ is a joint probability of targets' locations, $p(x_t|o_t)$ is a probability of the target's locations given known observations, $p(x_t|x_{t-1}, x_{t-2} \ldots x_0)$ is a probability of current targets' locations given known past target locations, $p(o_t|x_t)$ is a probability of observations $o_t$ given known target locations $x_t$ and, $p(x_t)$ models a joint prior probability of the targets' locations, and at least one of:

a) wherein the target's locations are determined as a vector of locations that maximizes the probability for each location target is calculated in accordance with:

$$\hat{x}_t = \underset{x_t}{\arg\max}\, P(x_t)$$

and
wherein the target observation probability for each target is assumed independent thus yielding $$p(o_t|x_t) = p(o_t^1|x_t^1)p(o_t^2|x_t^2) \ldots p(o_t^K|x_t^K)$$

where superscript indices 1, 2, . . . K refer to tracked targets, and b) the method further comprises simplification of the target propagation model and omitting interdependencies of propagation models among targets so that $$p(x_t|x_{t-1}, x_{t-2}, \ldots x_0) \approx p(x_t|x_{t-1}, x_{t-2})$$

$$p(x_t|x_{t-1}, x_{t-2}) = p(x_t^1|x_{t-1}^1, x_{t-2}^1)p(x_t^2|x_{t-1}^2, x_{t-2}^1) \ldots p(x_t^K|x_{t-1}^K, x_{t-2}^K)$$

where superscript indices 1, 2, . . . K refer to tracked targets.

11. The computer readable storage device of claim 10 wherein the target's locations are determined as a vector of locations that maximizes the probability for each location target is calculated in accordance with:

$$\hat{x}_t = \arg\underset{x_t}{\max}\, P(x_t).$$

12. The computer readable storage device of claim 11 wherein the target observation probability for each target is assumed independent thus yielding:

$$p(o_t|x_t) = p(o_t^1|x_t^1)p(o_t^2|x_t^2) \ldots p(o_t^K|x_r^K).$$

13. The computer readable storage device of claim 11 where multiple candidates of the target's locations are maintained and used for calculating the target's locations estimate.

14. The computer readable storage device of claim 11 and further comprising identifying motions indicative of sweethearting.

15. The computer readable storage device of claim 10 and further comprising simplification of the target propagation model and omitting interdependencies of propagation models among targets so that $$p(x_t|x_{t-1}, x_{t-2}, \ldots x_0) \approx p(x_t|x_{t-1}, x_{t-2})$$

$$p(x_t|x_{t-1}, x_{t-2}) = p(x_t^1|x_{t-1}^1, x_{t-2}^1)p(x_t^2|x_{t-1}^2, x_{t-2}^1) \ldots p(x_t^K|x_{t-1}^K, x_{t-2}^K).$$

16. The computer readable storage device of claim 15 wherein the probability densities of the final equation $$P(x_t) \approx p(o_t^1|x_t^1)p(o_t^2|x_t^2) \ldots p(o_t^K|x_t^K)p(x_t)p(x_t^1|x_{t-1}^1, x_{t-2}^1)p(x_t^2|x_{t-1}^2, x_{t-2}^2) \ldots p(x_t^K|x_{t-1}^K, x_{t-2}^K)$$

expressed in non-parametric form with each probability term represented by multidimensional matrixes with element values trained on a training data set that captures motion constraints corresponding to a selected constrained environment.

* * * * *